Figure 1:
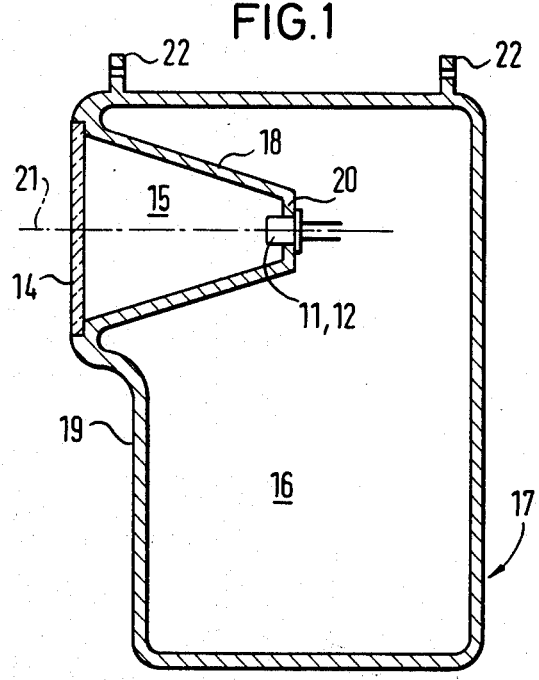

United States Patent [19]
Walter

[11] 4,354,106
[45] Oct. 12, 1982

[54] LIGHT BARRIER APPARATUS

[75] Inventor: Arthur Walter, Waldkirch, Fed. Rep. of Germany

[73] Assignee: Erwin Sick GmbH Optik-Elektronik, Fed. Rep. of Germany

[21] Appl. No.: 126,236

[22] Filed: Mar. 3, 1980

[30] Foreign Application Priority Data

Mar. 14, 1979 [DE] Fed. Rep. of Germany ....... 2910064

[51] Int. Cl.³ ............................................ G01D 21/04
[52] U.S. Cl. ................................... 250/239; 250/221
[58] Field of Search .................... 250/221, 222 R, 229, 250/551, 239

[56] References Cited

U.S. PATENT DOCUMENTS

| | | | |
|---|---|---|---|
| 3,412,257 | 11/1968 | Miller et al. | 250/239 |
| 4,012,635 | 3/1977 | Walter et al. | 250/221 |
| 4,029,957 | 6/1977 | Betz et al. | 250/221 |

FOREIGN PATENT DOCUMENTS

| | | |
|---|---|---|
| 1964127 | 4/1967 | Fed. Rep. of Germany . |
| 7427714 | 9/1975 | Fed. Rep. of Germany . |
| 7427031 | 9/1976 | Fed. Rep. of Germany . |
| 1595548 | 6/1970 | France . |

*Primary Examiner*—David C. Nelms
*Assistant Examiner*—Darwin R. Hostetter
*Attorney, Agent, or Firm*—Townsend and Townsend

[57] ABSTRACT

Light barrier apparatus generally features a light transmitter for projecting light across a region to be monitored to a light receiver. The light transmitter and receiver units can either be separate or can be combined in a single housing and used in conjunction with a retroreflector for returning light from the sender to the receiver.

In any of these arrangements the light transmitter and/or sender units incorporate photoelectric converter components 11, 12 and optical projection components 13, 14 together with electronic processing elements which enable interruption of the light barrier to be detected. The present arrangement features a housing 17 including at least one sealed chamber 15, 15', 15" containing solely the optical and photoelectric converter elements. These chambers are thus sealed against the ingress of contamination and moisture. The remaining elements of the electronic processing circuit are housed separately in a further chamber 16. The housing together with the fixed walls 18, 18', 18" of the sealed chambers 15, 15', 15" is usefully injection molded in one piece and preferably together with sighting aids 22.

16 Claims, 4 Drawing Figures

LIGHT BARRIER APPARATUS

The present invention relates to light barrier apparatus and has particular reference to a housing incorporating at least one of the light transmitter and light receiver for the light barrier.

Known light barrier apparatus suffers from the problem that the optical components easily become contaminated or dirtied or their operating efficiency is deleteriously affected by the formation of condensation. In addition difficulties are experienced in aligning the optical axes of the sender and receiver, or, in an autocollimation device in aligning the optical axes of the sender and receiver units with the separate reflector. In addition it is important to maintain a precise relationship between the effective optical axis of the apparatus and the axis or a reference line or reference surface of the housing.

Satisfying these requirements is particularly difficult with modern light barriers which operate with light in the invisable part of the spectrum. For these types of light barrier it is generally only possible to ensure the troublefree alignment of the light barrier housing in a simple manner using sighting aids located on the housing.

It is thus a principal object of the present invention to provide light barrier apparatus with a housing which is of simple construction and which can be very economically manufactured, in which the optical components which come into contact with the light beam are completely protected against contamination and the formation of condensation and which guarantees at the stage of manufacture that a troublefree association exists between the axis of the housing and the optical axis.

This object is preferably accomplished in accordance with the invention by the provision of light barrier apparatus having a housing incorporating photoelectric converter means, said means comprising at least one of a photoelectric transmitter for generating a beam of light for subsequent propagation across a region to be monitored by the light barrier apparatus and a photoelectric receiver for receiving light returned from the monitored region, optical elements on which the light beam is incident and electronic processing elements, the apparatus being characterized in that the housing includes as an integral part at least one sealed chamber housing said photoelectric converter means and said optical elements and at least one further chamber containing said electronic processing elements, said sealed chamber being divided by fixed wall means of the housing from said further chamber.

The fixed wall means defining said sealed chamber preferably form an optical tube integrated into the housing. This optical tube preferably extends into the housing from a window provided in a sidewall thereof. This window, depending on whether the apparatus is basically a light barrier transmitter, a light barrier receiver or a combined unit defines the light exit and/or the light entry surface for the beam of the light barrier. The window is in any case sealingly closed by an optical element such as an objective lens, a cover plate or a filter. At its end remote from the window the tube is usually arranged to carry the associated photoelectric transmitter and/or receiver.

The photoelectric transmitter and/or receiver can themselves usefully be used to seal the inner end of the optical tube remote from the window.

The optical tube advantageously diverges conically outwardly from the associated photoelectric converter means.

In light barrier apparatus incorporating only a photoelectric transmitter or a photoelectric receiver the invention envisages only the use of a single optical tube extending from a window provided in one of the narrow sidewalls of the housing. If however a light transmitter and receiver are united into a single housing then two optical tubes are conveniently arranged alongside one another with both optical tubes extending away from a window or windows. Preferably only a single window is provided and is sealingly closed by a single optical element, such as one of the afore-mentioned objective lens, cover plate, or filter.

Thus in accordance with the present teaching there is provided a separate optical space which is hermetically sealed from the atmosphere and from the remaining interior space of the housing. This optical space which can be manufactured without difficulty or expense thus remains absolutely free from contamination and condensation throughout its entire surface life.

As the optical tube or tubes can conveniently be manufactured in one with the housing, for example by injection molding techniques, it can be ensured that a fixed association is present between the alignment of the optoelectronic components and the housing. The alignment of the optical axis with the axis of the housing is ensured, reproducably and without problem, by arranging for the optical tube to simultaneously centre the objective lens. The decisive factor in ensuring an exact relationship between the optical axis and the axis of the housing is the quality of the tools that are used for manufacturing the housing.

A further advantage of the present construction is that the optical space or chamber remains tightly sealed even when it is necessary to open the housing for example to effect cable connections or to carry out adjustments. Moreover during manufacture it is possible to firstly finish the optical chamber with all its associated elements so that it is protected against the entry of contamination or moisture and then to arrange the other elements of the electronic processing circuit in the housing.

Figure 2:
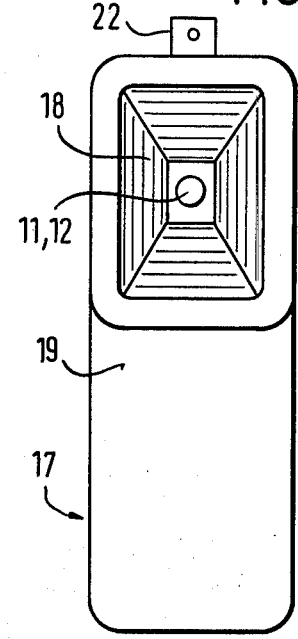
Figure 3:
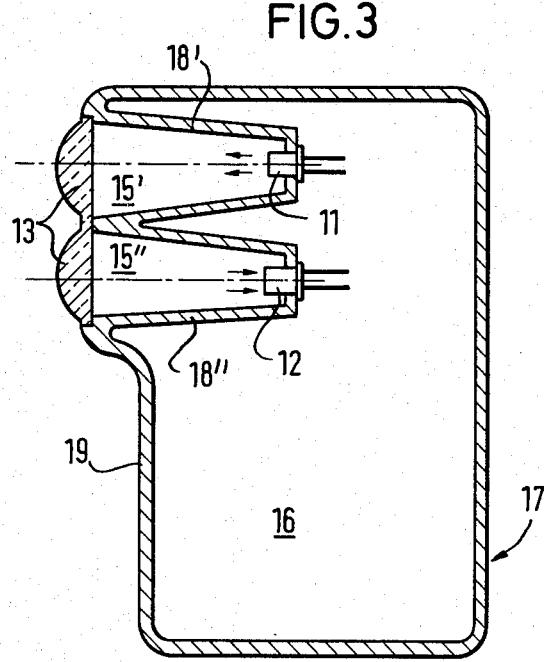
Figure 4:
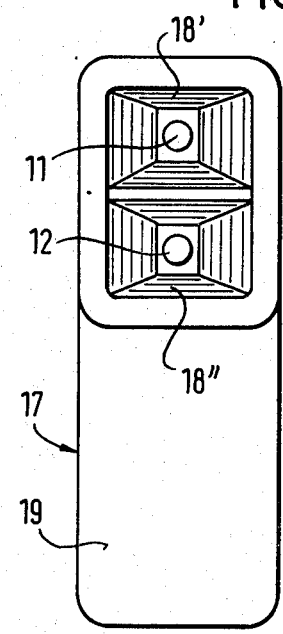

The invention will now be more specifically described in the following by way of example only and with reference to the accompanying drawings in which are shown:

FIG. 1 a sectioned side view of a first embodiment of a housing for the light barrier apparatus, FIG. 2 a front view of the subject of FIG. 1, FIG. 3 a sectioned side view of a further embodiment of a housing for light barrier apparatus and FIG. 4 a front view of the subject of FIG. 3.

Turning first of all to FIGS. 1 and 2 there can be seen a general illustration of an item of light barrier apparatus which can be either a light transmitter or a light receiver. It will be understood that two similar units namely one light transmitter and one light receiver would be arranged at opposite ends of a region to be monitored so that a light beam projected from the light transmitter is directed towards the light receiver.

As seen in the illustrations the light barrier unit comprises a housing generally indicated at 17 which is of generally rectangular shallow box-like form. An integral optical tube 18 extends into the interior of the housing from a window 14 formed in one narrow side of the housing. As can be seen more clearly from FIG. 2 the optical tube 18 has a generally rectangular cross-section and tapers in conical fashion from the narrow sidewall 19 to its inner end. This inner end of the optical tube is located approximately half way inside the housing 17. The inner end 20 of the optical tube 18 which is closed on all sides by fixed walls houses in a sealed arrangement a photoelectric converter in the form of either a photoelectric transmitter or a photoelectric receiver depending on whether the unit is a transmitter or receiver unit. The outer end of the optical tube 18 is closed by a window in the form of a cover plate. This cover plate can alternatively be replaced with a filter or an objective lens. In any case the window defined by the cover plate, filter or objective lens is also arranged in sealed fashion in the housing 17.

As a result of this construction a sealed optical chamber or space 15 is present within the optical tube 18 which is hermetically sealed from atmosphere and from the further chamber defined by the remaining inner space 16. The optical chamber 15 is thus sealed against the ingress of contamination or moisture. The electronic processing elements which are associated with the light transmitter or receiver but which do not come into contact with the light beam are housed within the further chamber 16. These electronic processing elements are not shown because they do not form part of the detail of the present invention. Full details of suitable electronic processing circuits and components can be found by referring to any one of a large number of published patent specifications. As the chamber 15 is divided by fixed wall means of the housing from the further chamber 16 it remains sealed even when the housing must be opened in order to allow assembly, repair, installation or adjustment of the electronic processing elements. The sealed optical chamber 15 is thus protected for the entire service life of the light barrier unit against contamination and the formation of condensation.

One particular advantage of the above described construction is that the optical axis 21 of the optical part is exactly aligned to the walls of the housing 17 as a result of the optical tube 18 being injection molded together with the housing 17 in one manufacturing step. As a result it is possible to simultaneously injection mold a sighting aid 22 with the housing so that even when operating with light outside of the visable spectrum the light barrier unit can be accurately aligned with the unit at the other end of the monitoring region, i.e. a light transmitting unit, a light receiver unit or a reflector. As can be seen from FIGS. 1 and 2 the sighting aid 22 conveniently has the form of a pair of spaced apart lugs each having a sighting aperture with the two sighting apertures aligned with the optical axis 21 of the unit.

Turning to FIGS. 3 and 4 there can be seen an embodiment of the invention which is particularly useful for an autocollimation light barrier, i.e. a light barrier in which the light transmitter and receiver are arranged in one unit. In this arrangement two optical tubes 18', 18" are arranged alongside each other and in particular one above each other in the housing 17. These optical tubes are likewise made in one piece together with the remaining parts of the housing (apart of course from a cover plate member). The front openings of the two sealed optical chambers 15', 15" which are defined by the two tubes 18', 18" respectively are closed by a window in the form of a one piece double lens 13. A photoelectric transmitter 11 and a photoelectric receiver 12 are located at the far ends of the optical tubes 18', 18" respectively and are each associated with one of the lenses of the double lens 13. For this embodiment a retro-reflector (not shown) is provided at the opposite end of the monitoring region and reflects the light received from the light transmitter 11 via one part of the double lens 13 back to the receiver 12 via the other lens of the double lens 13.

As in the previous embodiment the optical chambers 15', 15" are hermetically sealed relative to the atmosphere and relative to the further internal chamber 16 of the housing 17 so that neither contamination nor moisture can enter the optical tubes 18', 18".

Thus, in accordance with the present teaching, the accurate construction of the mountings for the optical and optoelectronic components in the optical tube (or tubes) thus stems from the initial manufacture of the housing and the optical tube (or tubes) as a unitary component. In this way the optical accuracy is predetermined from the outset.

The housing 17 can easily be closed by a suitably designed cover plate, this cover plate does not however play any roll in sealing the sealed optical chamber 15 because this chamber is defined by fixed wall means of the housing.

It will be apparent to those skilled in the art that detailed modifications may be made to the arrangements herein described without departing from the spirit of the present teaching.

I claim:

1. Light barrier apparatus comprising a housing having at least first and second chambers and a removable cover plate with said first chamber being separated by fixed wall means of said housing from said second chamber and hermetically sealed relative to both said second chamber and the atmosphere, said cover plate permitting access to said second chamber but not said first chamber; optically transparent window means defining at least part of an external wall of said first chamber; photoelectric converter means comprising at least one of a photoelectric transmitter for generating a first beam of light for subsequent propagation across a region to be monitored by said light barrier apparatus and a photoelectric receiver for receiving a second beam of light passing across said region to said light barrier apparatus and electronic components associated with said photoelectric converter means and wherein said electronic components are located in said second chamber and said photoelectric converter means is located in said first chamber.

2. Light barrier apparatus in accordance with claim 1 wherein the fixed wall means dividing said first chamber from said second chamber define an optical tube.

3. Light barrier apparatus according to claim 2 wherein said optically transparent window means comprises at least one of an objective lens, a window plate and a filter sealingly attached to said external wall, and wherein the fixed wall means defining said optical tube extends away from said optically transparent window means into the interior of the housing and carries said photoelectric converter means at the end of the optical tube remote from said optically transparent window means.

4. Light barrier apparatus according to claim 3 wherein said photoelectric converter means sealingly closes the optical tube at its end remote from said optically transparent window means.

5. Light barrier apparatus according to claim 3 wherein said the optical tube diverges generally conically away from said photoelectric converter means.

6. Light barrier apparatus according to claim 1 wherein said optically transparent window means is provided in a narrow sidewall of said housing and wherein said fixed wall means extend rearwardly from said optically transparent window means into the housing to define a single optical tube.

7. Light barrier apparatus in accordance with claim 1 wherein said photoelectric converter means comprises both said photoelectric transmitter and said photoelectric receiver, and wherein said fixed wall means extends from said window means into the housing and defines first and second optical tubes disposed respectively one alongside the other and respectively associated one with each of said photoelectric transmitter and said photoelectric receiver and jointly defining said first chamber.

8. Light barrier apparatus comprising a housing having at least first and second chambers and a removable cover plate with said first chamber being separated by fixed wall means of said housing from said second chamber and hermetically sealed relative to both said second chamber and the atmosphere, said cover plate permitting access to said second chamber only; optically transparent window means defining at least part of an external wall of said first chamber; photoelectric converter means comprising at least one of a photoelectric transmitter for generating a first beam of light for subsequent propagation across a region to be monitored by said light barrier apparatus and a photoelectric receiver for receiving a second beam of light passing across said components associated with said photoelectric converter means, wherein said electronic components are located in said second chamber and said photoelectric converter means is located in said first chamber and wherein said housing and said fixed wall means are manufactured together as a unitary injection molded part.

9. Light barrier apparatus according to claim 7 wherein said optically transparent window means comprises a single optical element sealingly connected to a sidewall of said housing.

10. Light barrier apparatus according to claim 14 and wherein said housing includes a sighting aid.

11. Light barrier apparatus according to claim 10 wherein said sighting aid comprises a pair of spaced apart elements carrying optical reference features.

12. Light barrier apparatus according to claim 10 wherein the optical axis of said sighting aid lies substantially parallel to an optical axis of the light barrier apparatus.

13. A light barrier apparatus enclosure comprising:
a housing having fluid impervious peripheral and end walls defining an optical chamber and outer walls defining a processing chamber, said optical chamber defining an optical axis passing generally centrally within said peripheral wall and through said end wall; and
a transparent cover sealably mounted to said housing at an outer end of the optical axis opposite said end wall and forming a boundary element of said optical chamber;
a photoelectric device sealably mounted to said end wall along said optical axis;
said peripheral wall, end wall, cover and photoelectric device adapted to form a hermetically sealed optical chamber.

14. The enclosure of claim 13 further comprising sighting means formed integrally with said housing, said sighting means defining a sighting axis parallel to said optical axis.

15. The enclosure of claim 13 wherein said housing defines first and second optical chambers, a photoelectric receiver mounted in the end wall of said first optical chamber and a photoelectric transmitter mounted in the end wall of said second optical chamber.

16. The enclosure of claim 13 wherein said cover is a lens.

* * * * *

UNITED STATES PATENT AND TRADEMARK OFFICE
CERTIFICATE OF CORRECTION

PATENT NO. : 4,354,106

DATED : Oct. 12, 1982

INVENTOR(S) : Arthur Walter

It is certified that error appears in the above-identified patent and that said Letters Patent is hereby corrected as shown below:

Column 6, line 5, claim 10 should read as follows:

10. Light barrier apparatus according to claim 8 and wherein said housing includes a sighting aid.

Signed and Sealed this

Fourteenth Day of December 1982

[SEAL]

Attest:

GERALD J. MOSSINGHOFF

Attesting Officer

Commissioner of Patents and Trademarks